United States Patent [19]

Manabe et al.

[11] 4,305,128
[45] Dec. 8, 1981

[54] METHOD AND APPARATUS FOR CONTROLLING ORIENTATION OF TOOLS

[75] Inventors: Takao Manabe; Shoichi Shin, both of Shizuoka; Hitoshi Ebata, Mishima, all of Japan

[73] Assignee: Toshiba Kikai Kabushiki Kaisha, Tokyo, Japan

[21] Appl. No.: 23,010

[22] Filed: Mar. 21, 1979

[30] Foreign Application Priority Data

Mar. 24, 1978 [JP] Japan .................. 53/33805

[51] Int. Cl.³ .................. G05B 19/25; B26D 5/30
[52] U.S. Cl. .................. 364/475; 83/71; 83/925 CC; 318/570
[58] Field of Search .................. 364/475, 474, 118; 318/570, 571, 572; 83/925 CC, 71, 747, 528, 34

[56] References Cited

U.S. PATENT DOCUMENTS

| 3,610,081 | 10/1971 | Gerber | 83/925 CC |
| 3,780,607 | 12/1973 | Gerber | 83/925 CC X |
| 3,864,997 | 2/1975 | Pearl et al. | 83/925 CC X |
| 3,911,346 | 10/1975 | Schneekloth | 318/572 X |
| 4,116,101 | 9/1978 | Kawakami et al. | 83/747 |
| 4,133,234 | 1/1979 | Gerber | 83/925 CC X |
| 4,133,235 | 1/1979 | Gerber | 83/925 CC X |

*Primary Examiner*—Joseph F. Ruggiero
*Attorney, Agent, or Firm*—Koda and Androlia

[57] ABSTRACT

When cutting a groove of a predetermined contour through a plate shaped workpiece with a fret saw blade, various program data regarding the direction of movements of the fret saw blade and the contour of the groove to be cut are stored in a memory device. The fret saw blade is moved in a direction instructed by the memory device and the orientation of the saw blade is controlled at the starting point of each segment of the groove.

3 Claims, 18 Drawing Figures

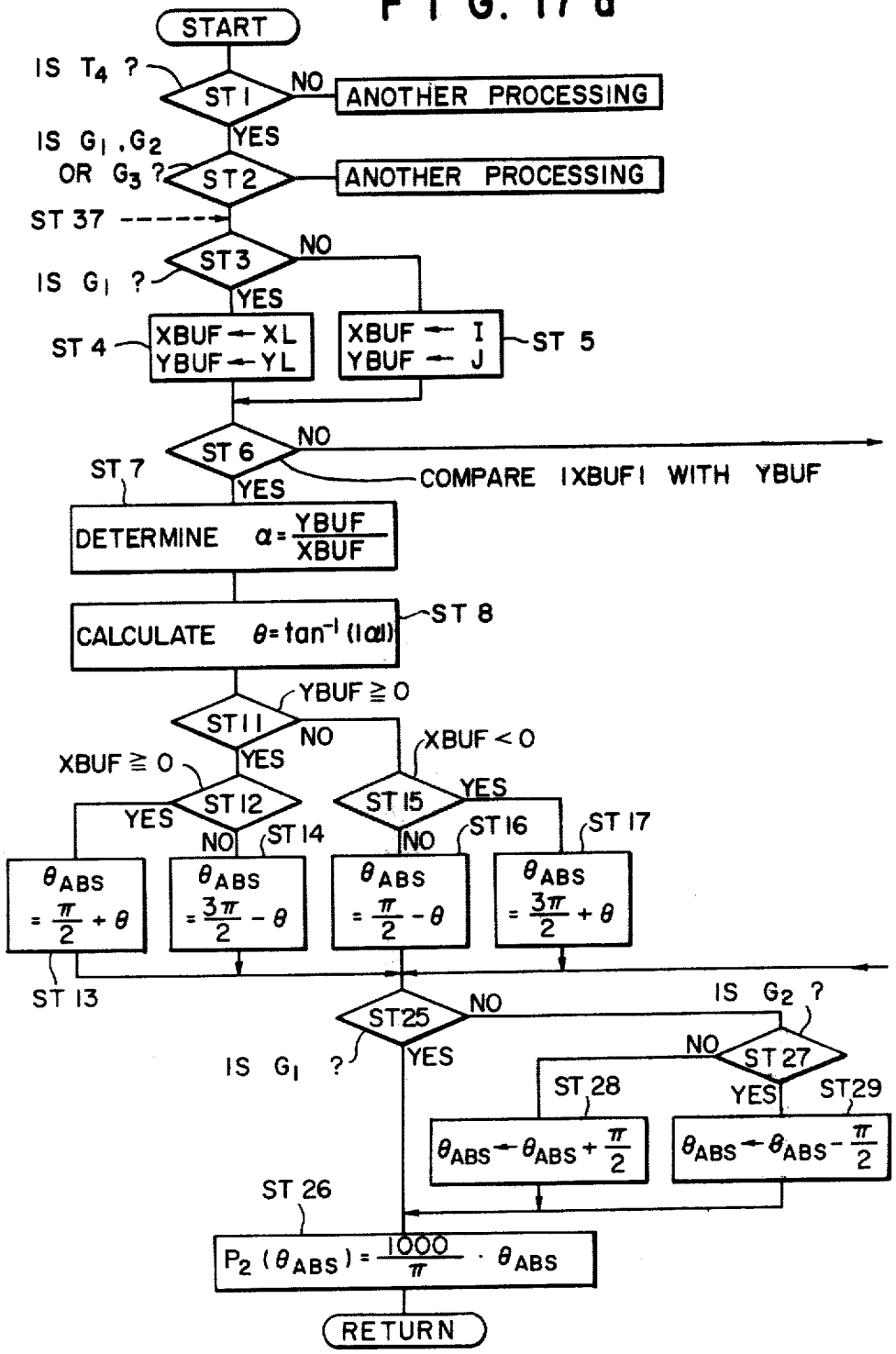

FIG. 17b
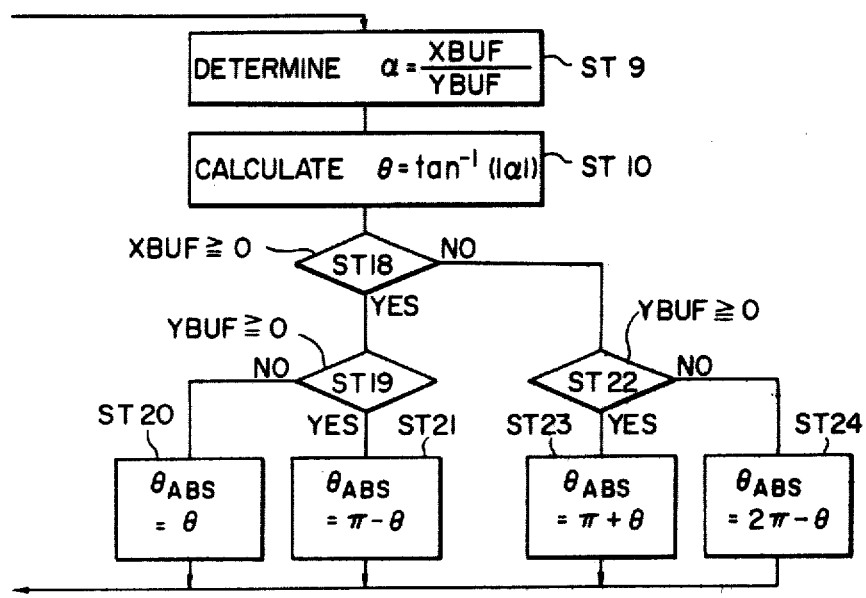
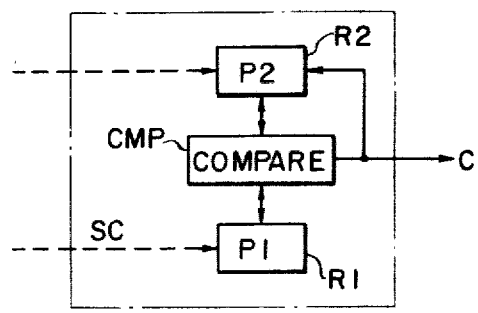

METHOD AND APPARATUS FOR CONTROLLING ORIENTATION OF TOOLS

BACKGROUND OF THE INVENTION

This invention relates to a method and apparatus for controlling the orientation of a tool, and more particularly a method and apparatus for controlling the orientation of a tool so as to coincide the orientation with the direction of movement of a spindle at the start thereof prior to the actual movement of the spindle which is caused by a datum regarding the movement of the tool relative to a workpiece.

In a working machine wherein a sheet shaped workpiece is cut along a predetermined profile, or in a fret saw machine in which during cutting of a sheet blank the fret saw blade is reciprocated in the vertical direction while at the same time the orientation of the fret saw blade is constantly controlled such that it is tangential to a predetermined cutting profile, it is generally necessary to always orient the tool in the tangential direction with respect to the cutting profile during the cutting operation in addition to moving the tool with respect to the workpiece.

For the sake of description a fret saw machine will be taken as an example of such working machines.

Where a groove having a predetermined profile is cut through a die board, with a prior art fret saw machine a profile curve is drawn on the die board and an operator rotates the die board on a table such that the fret saw blade is always oriented tangentially with respect to the profile. In this case, the fret saw blade itself would not be rotated.

However, when the area of the die board is large, it is difficult for the operator to accurately and rapidly follow the profile drawn on the die board. Furthermore, it is difficult to employ skilled workmen. For these reasons, it has been desired to automate a fret saw machine for working die boards.

There has already been proposed a numerical control device for accurately executing a contouring of a tool with respect to a workpiece as in an NC machine tool. However, the cutting tool utilized in the NC machine tool is generally rotated by the spindle thereof and the axis of the tool is guided along a contour and it is not necessary to control the orientation of the tool.

In an optical profiling machine, there is provided a head with a servomechanism which follows a given profile curve and the orientation of a tool is controlled in an electrically interlocked relationship with the head. However, such machine cannot follow the profile curve when it contains one or more discontinuities.

SUMMARY OF THE INVENTION

It is an object of this invention to provide a novel method and apparatus capable of controlling not only the relative movement of a tool and a workpiece but also controlling the orientation of the tool during the movement thereof when data regarding the relative axial movement of the tool and the workpiece is given.

According to one aspect of this invention, there is provided a method of controlling an orientation of a tool at a starting point of working comprising the steps of (a) predetermining $G_1$, XL, YL for linear movement segments, $G_2$, XL, YL, I, J or $G_3$, XL, YL, I, J for arcuate movement segments of said tool as program data for relatively moving the tool with respect to a workpiece, (b) judging whether given data relate to a straight line segment ($G_1$) or an arcuate segment ($G_2$) or ($G_3$), (c) storing data XL and YL in buffer registers (XBUF) and (YBUF) respectively where the result of judgement of step (b) shows a straight line segment and storing data I and J in the buffer registers (XBUF) and (YBUF) respectively when the result shows an arcuate segment, (d) comparing the absolute values of the contents of the buffer registers (XBUF) and (YBUF), (e) calculating an angle $\theta = \tan^{-1}|\alpha|$ when $|XBUF| \geq |YBUF|$, where $$\alpha = \frac{YBUF}{XBUF}$$

and XBUF and YBUF represent the contents of the buffer registers (XBUF) and (YBUF) respectively, (f) calculating an angle $\theta = \tan^{-1}|\alpha|$ when $|XBUF| < |YBUF|$ where $$\alpha = \frac{XBUF}{YBUF},$$

(g) judging whether the signs of XBUF and YBUF are one of the combinations $(+,+)$, $(+,-)$, $(-,+)$ and $(-,-)$ or not, provided that + sign includes a zero, (h) combining the results of steps (d) and (g) to add to $\theta_{ABS}$ one of $(\pi/2)+\theta$, $(3/2)\pi-\theta$, $(\pi/2)-\theta$, $(3/2)\pi+\theta$, $\theta$, $\pi-\theta$ and $2\pi-\theta$ in accordance with the result of combination thus determining an angle of orientation $\theta_{ABS}$ of the tool and (i) when an arc is judged as a result of step (b), judging whether working is made in the clockwise direction ($G_2$) or counter clockwise direction ($G_3$) and when $G_2$ is judged subtracting $\pi/2$ from $\theta_{ABS}$ given by step (h) to determine a new $\theta_{ABS}$, whereas when $G_3$ adding $\pi/2$ to $\theta_{ABS}$ to form another new $\theta_{ABS}$ in the above $G_1$ represents a code meaning a straight line interpolation, $G_2$ a code meaning a clockwise arcuate interpolation, $G_3$ a code meaning a counter-clockwise arcuate interpolation, XL and YL represent rectangular coordinates of an end point of a linear or an arcuate movement and I and J increments from centers of arcuate movements in clockwise and counter-clockwise directions respectively with reference to starting points of said arcuate movement.

According to another aspect of this invention there is provided apparatus for controlling an orientation of a tool such that the tool is oriented tangentially to a profile on a workpiece to be worked by the tool, comprising means for storing a present orientation $\theta_{ABSO}$ of the tool measured from a reference direction, means for successively supplying a program data for moving the tool relative to the workpiece with reference to segment of the profile, means for successively changing the orientation of the tool according to data given by the program data at a starting point of a new segment, means for confirming that the present orientation coincides with the orientation instructed by said memory means, and means for moving the tool relative to the workpiece after the confirmation.

DESCRIPTION OF THE PREFERRED EMBODIMENT

Figure 1:
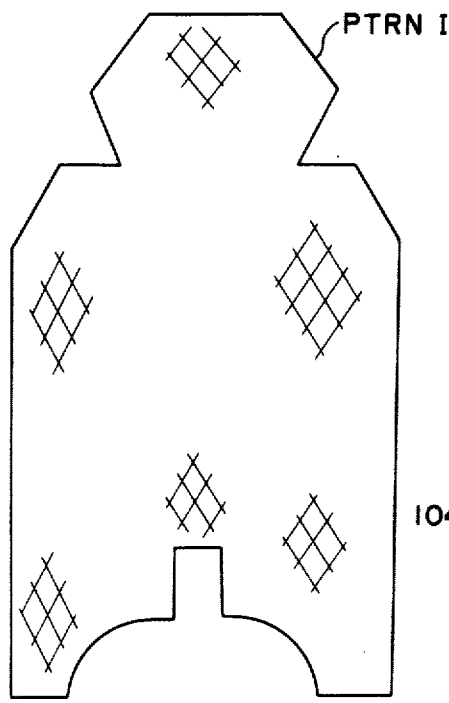
FIG. 1 is a plan view showing a stamped package pattern.
Figure 2:
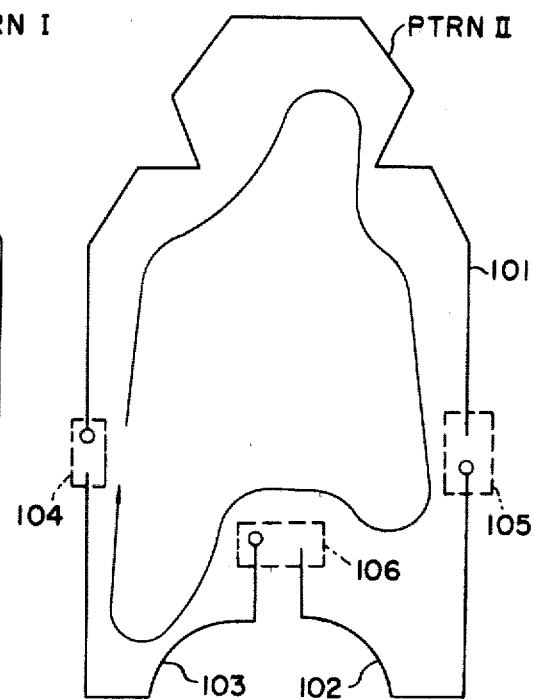
FIG. 2 is a plan view showing a die board formed with a groove for embedding cutting blades utilized to punch the package pattern shown in FIG. 1.
Figure 3:
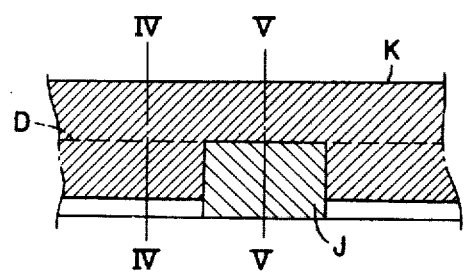
FIG. 3 is an enlarged sectional view of the no cut portion 105 shown in FIG. 2 cut in the direction of the groove.
Figure 4:
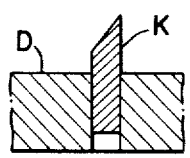
FIGS. 4 and 5 are cross-sectional views respectively taken along section lines IV—IV and V—V in FIG. 3.
Figure 5:
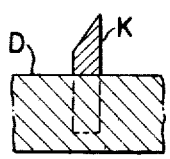

Referring now to the accompanying drawings, a groove pattern PTRNII (see FIG. 2) corresponding to a desired punching pattern (for example, a package pattern) PTRNI as shown in FIG. 1 is formed on a die board utilized as a punching die for paper articles. In the groove shown in FIG. 2 is implanted a cutting blade K as shown in FIG. 3. At a portion J where the groove is discontinuous the lower portion of the blade K is provided with a recess.

As shown in FIG. 2, the groove pattern PTRNII is made up of a plurality of sections 101, 102 and 103 with noncutting sections 104, 105 and 106 therebetween. More particularly, although a completed stamping pattern PTRNI has a closed contour, the groove pattern PTRNII for implanting the cutting blade K is not continuous as shown in FIG. 2. An arrow shown in FIG. 2 indicates the direction of cutting the groove.

Figure 6:
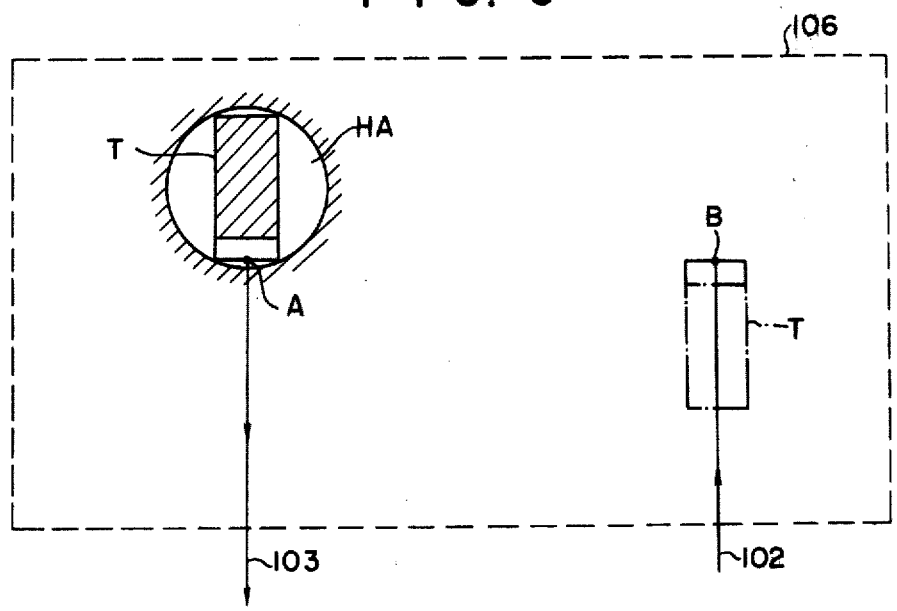
FIG. 6 is a diagram showing one example of a manner of varying the orientation of fret saw teeth at portion 106 shown in FIG. 2.

FIG. 6 shows the variation in the orientation of the cutting tool (that is the fret saw blade) at a portion near section 106 shown in FIG. 2 in which a fret saw blade T (shown by dot and dash lines) after completion of the cutting of a groove cutting section 102, and a fret saw T (shown by solid lines) inserted in an opening HA corresponding to the starting point A of the cutting of section 103 are shown. At the starting point A the center of a tooth of the saw is oriented in the cutting direction (downwardly).

In order to change the orientation of the saw tooth T from that at the end point of the cutting section 102 to that at the starting point of the cutting section 103, the fret saw blade T is firstly withdrawn from the die board D at point B, the axis of the fret saw is moved from point B to point A, the center of the tooth of the fret saw blade T is made to coincide with point A, the fret saw blade is rotated 180° about point A, and then the fret saw blade is inserted into the opening HA which of course has been formed previously.

Figure 7:
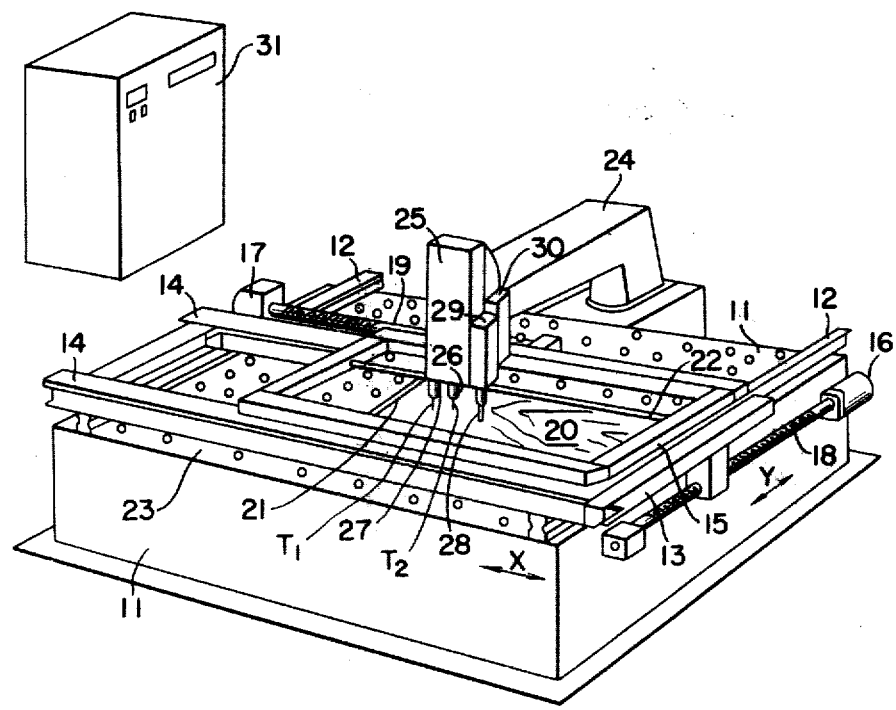
FIG. 7 is a perspective view showing a die board working machine embodying the invention.

A die board working machine shown in FIG. 7 comprises a bed 11, Y direction guides 12 mounted thereon, a Y table 13 supported by the guides 12, X direction guides 14 mounted on the Y table 13 and an X table 15 supported by the guides 14. The Y and X tables 13 and 15 are driven by pulse motors or servomotors 16 and 17 and feed screws 18 and 19 respectively. Clamping bars 21 and 22 for clamping a plate or a workpiece 20 are secured to the frame of the X table 15 in a manner to be adjustable in the X and Y directions of the rectangular coordinates for clamping the side wall of plate 20. A plurality of suitably spaced balls or wheels 23 are provided on the upper surface of the bed 11 so as to permit smooth movement of the plate. An arm 24 is provided to extend above the bed 11 and a head 25 is mounted on the inner end of the arm 24. Upper clamping members 26 and 27 for fret saw blades $T_1$ and $T_2$ project from the bottom of the head 25, and on the side thereof is mounted a pneumatic cylinder 30 for vertically moving a driving unit 29 of a drill 28 which is used to form openings for inserting fret saw blades at desired positions of the plate 20. Although not shown, a mechanism for vertically moving the clamping members 26 and 27 and pulse motors for rotating the fret saw blades $T_1$ and $T_2$ are contained in the head 25. The other head, not shown, identical to head 25 and containing a mechanism for vertically moving automatic clamping members and pulse motors for rotating the fret saw blades is disposed in the bed 11 immediately beneath the head 25. The vertical reciprocating mechanisms and the pulse motors contained in both heads are operated synchronously. A digital control device 31 is provided for supplying instruction pulses to pulse motors 16 and 17 for moving the die board working machine and to pulse motors (FIG. 8, 34) contained in the heads for rotating the fret saw blades.

Figure 8:
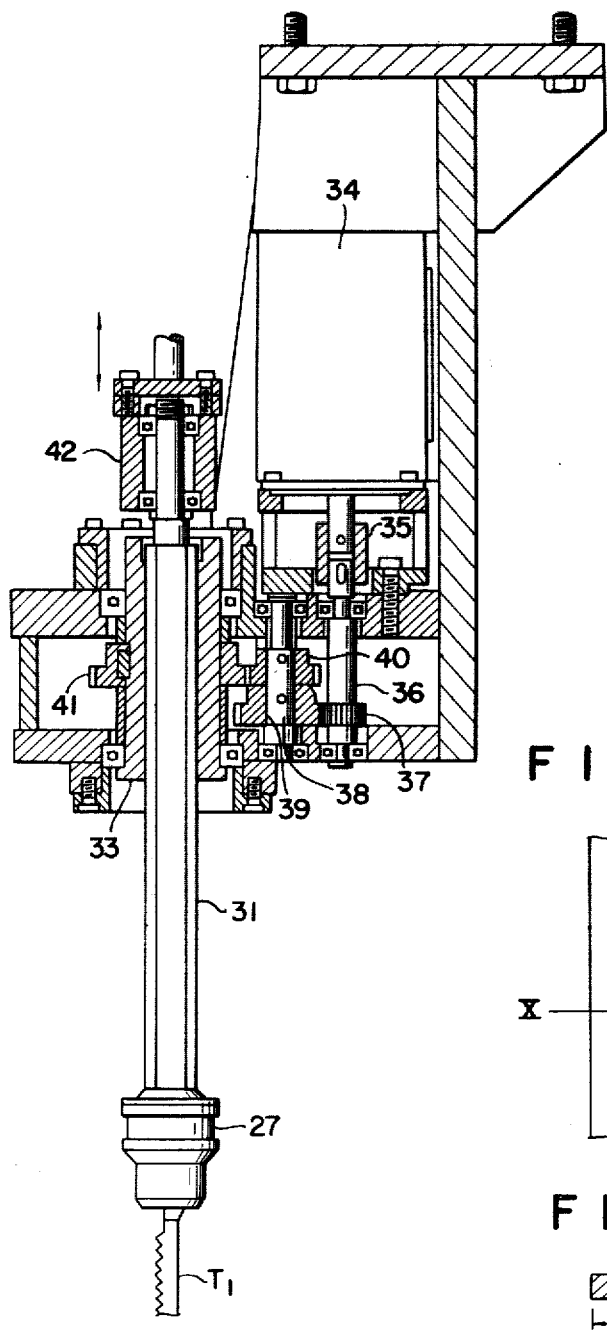
FIG. 8 is a longitudinal sectional view showing fret saw blade rotating device of the working machine shown in FIG. 7.
Figure 9:
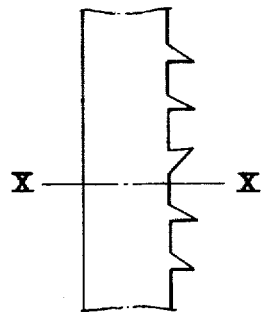
FIG. 9 is a side view of a fret saw blade.

FIG. 8 shows the detail of the mechanism for rotating the fret saw blade $T_1$ and contained in the head 25 shown in FIG. 7. More particularly, the rotation of the output shaft of the pulse motor 34 is transmitted to a shaft 36 through a coupler 35 to drive a spline sleeve 33 via gears 37, 39, 40, a shaft 38 and a gear 41, thus driving a spline shaft 31. The upper clamping member 27 for clamping the fret saw blade $T_1$ is secured to the lower end of the spline shaft 31. A cylindrical member 42 is mounted on the upper end of the spline shaft 31 through a pair of thrust bearings to drive a vertical reciprocation mechanism, not shown, contained in the head 25. The reciprocating mechanism may comprise a rotating shaft and a link mechanism, for example.

Figure 11:
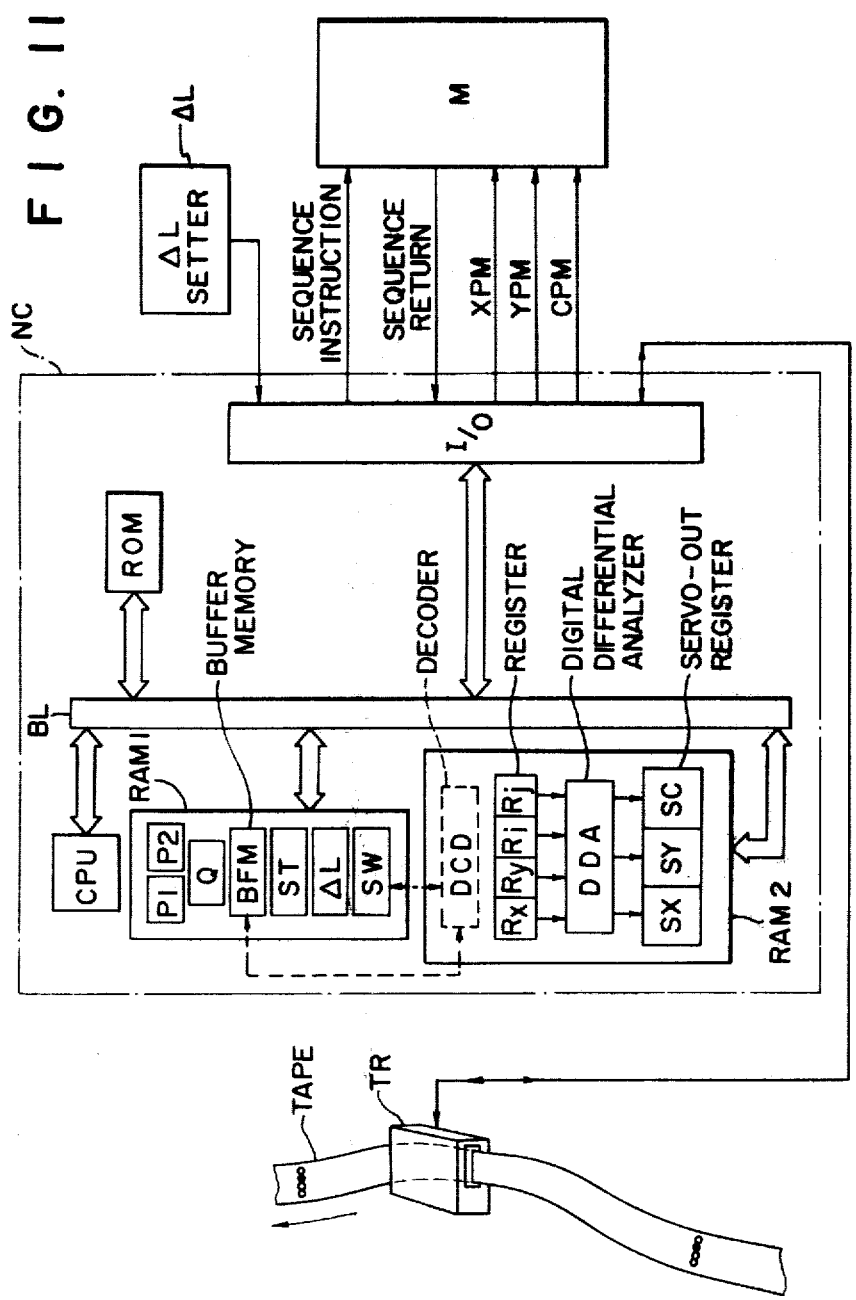
FIG. 11 is a block diagram showing a microcomputer system utilized as the control device of the working device shown in FIG. 7.

FIG. 11 is a block diagram showing a digital control system constituted by a microcomputer and utilized to produce instruction pulses for moving the die board in the X and Y directions relative to the fret saw blade $T_1$ and an instruction pulse for changing the orientation of the fret saw blade $T_1$ and the switch back control at the corners and to determine the positions of the opening for inserting the fret saw blades. The contents of respective blocks of a program tape are read by a tape reader TR, and the read out contents are stored in a buffer memory device BFM of a $RAM_1$ through an input/output unit I/O and a bus line BL. The content of the buffer memory device BFM is set in axis movement setting registers RX, RY, RI and RJ of $RAM_2$ through the bus line BL. Informations overflown from a digital differential analyzer DDA are applied to servo-out registers SX, SY and SC to act as instruction pulses for respective pulse motors. The outputs of these registers are applied to the die board working machine M via the bus line BL and the input/output unit I/O as pulse signals XPM, YPM and CPM.

The execution program instruction for executing the steps of reading the contents of respective blocks with the tape reader, storing the read out contents in the buffer memory device BFM, decoding the stored contents and finally applying the instruction pulses XPM, YPM and CPM is stored beforehand in a ROM in the form of a program memory device connected to the bus line BL, the ROM cooperating with a central processing unit CPU to sequentially carry out the steps described above. In the example shown in FIG. 11, a decoder shown by dotted lines operates to decode the content of the buffer memory device BFM to calculate the values to be set in the registers RX and RY in the case of a linear cutting, whereas the values to be set in the registers RX, RY, RI and RJ in the case of a circular cutting including a corner cutting. Also, in the $RAM_1$ is shown a memory area $\Delta L$ corresponding to the amount of switch back.

The value of $\Delta L$ is given by an external setter $\Delta L$, or in accordance with the tooth thickness of a fret saw blade T utilized for the working program (in this case it is not necessary to set $\Delta L$ from outside) or by calculating the value of $\Delta L$ at each point of inflection.

Figure 10:
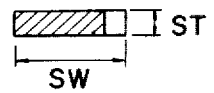
FIG. 10 is a cross-sectional view of the fret saw blade taken along a line X—X in FIG. 9.

In each case, when a forward switch back operation is made, $\Delta LX$ is given to register RX and $\Delta LY$ is given to register RY. Furthermore, the tooth thickness ST, tooth width SW (see FIG. 10) and an angle data $\theta$ of a C shaft which rotates the fret saw blade are stored in the $RAM_1$. As will be described later the angle data $\theta$ is used to control the C shaft.

The control (the C shaft control) of the rotation of the fret saw blade will now be described with reference to FIG. 12. In The X-Y rectangular coordinate system shown in FIG. 12, the orientation of the fret saw blade T is instructed to be any angle about an origin O. The orientation instruction is given, for example, by equally dividing a circle into 2000 units each having an angle of 0.18° (corresponding to one pulse) and by utilizing the $-Y$ axis as the reference. Thus, the orientation angle is expressed as an angle from the $-Y$ axis measured in the counterclockwise direction. For example, when the center of a tooth is directed in the direction of a vector $\overrightarrow{O.Q_1}$ the value of the absolute counter $C_{ABS}$ of shaft C is given by $$C_{ABS}(Q_1) = \frac{\theta_1}{0.18}$$

Similarly, in the cases of vectors $\overrightarrow{O.Q_2}$ and $\overrightarrow{O.Q_3}$ $$C_{ABS}(Q_2) = \frac{\theta_2}{0.18}, \quad C_{ABS}(Q_3) = \frac{\theta_3}{0.18}.$$

When a circular cutting is to be made from a starting point $Q_1$ to an end point $Q_2$ in the counterclockwise direction, the orientation of a tooth of the fret saw blade T at the starting point $Q_1$ is given by $$\theta = \theta_1 + 90 \text{ (in degrees)}.$$

In the same manner, the orientation of the tooth at a starting point $Q_3$ where a circular cutting is to be made from the starting point $Q_3$ to an end point $Q_2$ is given by $$\theta = \theta_3 - 90 \text{ (in degrees)}.$$

Figure 12:
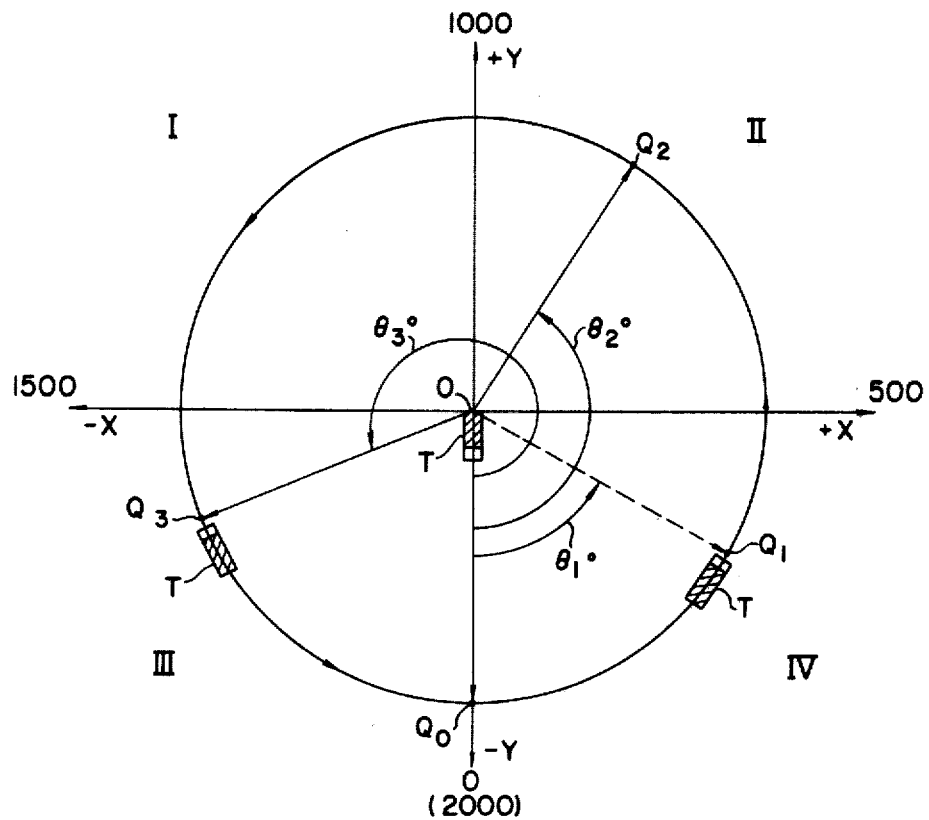
FIG. 12 is a diagram showing the variation in the orientation of the saw blade in which the -Y axis is taken as the reference.

In FIG. 12 I through IV designate the first to fourth quadrants.

Figure 13:
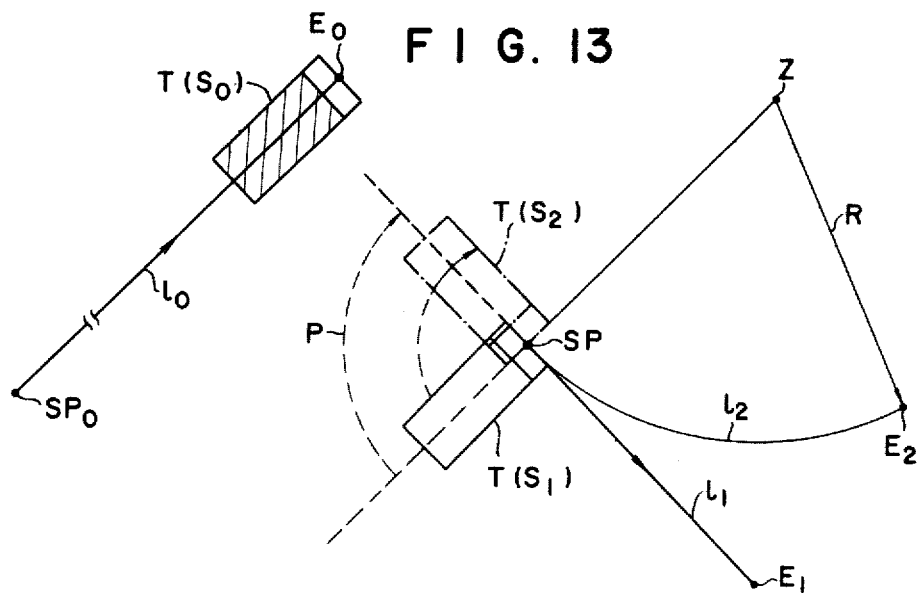
FIG. 13 is a diagram showing the variation in the orientation of the saw blade in a case where a non cutting movement is involved during the cutting operation.

With respect to the value $C_{ABS}$ of the C shaft absolute counter, axes $-Y$, X, Y and $-X$ have numbers of pulses of 0(2000), 500, 1000 and 1500, respectively. FIG. 13 shows one example of a sequential drive of the C shaft. Suppose now that a groove has been cut along a straight line $l_0$ from a point $SP_0$ to a point $E_0$ (the orientation of the tooth at this time is designated by $T(S_0)$). In order to bring the tooth to a state $T(S_2)$ at a cutting starting point SP for the purpose of cutting a straight line $l_1$ or an arc of a circle $l_2$, the following instruction codes are given (for brevity the sequences for inserting and removing the fret saw blade into and out of the plate are omitted).

I. Cutting of the straight line $l_1$ from point SP to point $E_1$ $G_1 X(SP_0) - X(\ ), Y(SP_0) - Y(\ )$ $G_1 X(E_0) - X(SP_0), Y(E_0) - Y(SP_0)$
$T_0 X(SP) - X(E_0), Y(SP) - X(E_0)$
$\rightarrow G_1 X(E_1) - X(SP), Y(E_1) - Y(SP)$ II. Cutting of the arc $l_2$ from point SP to point $E_2$ $G_1 X(SP_0) - X(\ ), Y(SP_0) - Y(\ )$ $G_1 X(E_0) - X(SP_0), Y(E_0) - Y(SP_0)$ $G_0 X(SP) - X(E_0), Y(SP) - Y(E_0)$ $\rightarrow G_3 X(E_2) - X(SP), Y(E_2) - Y(SP)$ $X(SP) - X(Z), Y(SP) - Y(Z)$ where $X(\ )$ and $Y(\ )$ show X and Y absolute coordinate values of the positions in respective brackets.

In both cases I and II, the fret saw blade is at a state of $T(S_0)$ and is withdrawn from the die board while the C shaft is moved in the X and Y directions to change the state $T(S_0)$ to $T(S_1)$ while maintaining the state $T(S_0)$ under an instruction code $G_0$. Then, when the code $G_1$ or $G_3$ following the code $G_0$ is read, in the case of I, an angle corresponding to a vector $\overrightarrow{SP \cdot E_1}$ or a number of pulses are calculated by a procedure described in connection with FIG. 12. This value is expressed by $$P_2 = P(\theta SP \cdot E_1)$$

Denoting the number of pulses corresponding to $\overrightarrow{SP_0 \cdot E_0}$ by $$P_1 = P(\theta SP_0 \cdot E_0)$$

the shaft C will be rotated by the difference $$\Delta P = P_2 - P_1$$

to change the orientation of the fret saw blade T to $T(S_2)$. Thus, the fact that the content $C_{ABS}$ of the C shaft absolute counter (present value counter) has changed to a value corresponding to the vector $\overrightarrow{SP \cdot E_1}$ is confirmed.

Such confirmation can be made by any one of various methods. With a microcomputer system as in this example, the RAM₁ shown in FIG. 11 is provided with a memory region corresponding to the C shaft present value register (counter) and an instruction value register corresponding to the vector $\overrightarrow{SP \cdot E_1}$ and a comparator which judges the coincidence of these two registers. Then, the output of the comparator provides such confirmation.

After the confirmation has been made, the fret saw blade is moved in the X and Y directions toward point E₁ for cutting a straight groove. Of course, prior to the cutting, the fret saw blade is inserted in the opening and a vertical reciprocating motion is imparted to the blade.

In the case of II, since the fret saw blade is rotated in the counterclockwise direction (G₃ code), as has been described with reference to FIG. 12, at the starting point of cutting SP, 90° is added to an angle $\theta Z \cdot SP$ corresponding to vector $Z \cdot SP$ so that $$P_2 = P(\theta Z \cdot SP) + 500$$
$$P_1 = P(\theta SP_0 \cdot E_0)$$

Thus, $\Delta p$ is given by $\Delta P = P_2 - P_1$.

In the drawing, vectors $\overrightarrow{SP_0 \cdot E_0}$ and $\overrightarrow{SP \cdot Z}$ are shown in the same direction showing that T(S₂) is the same for both cases I and II.

Figure 14:
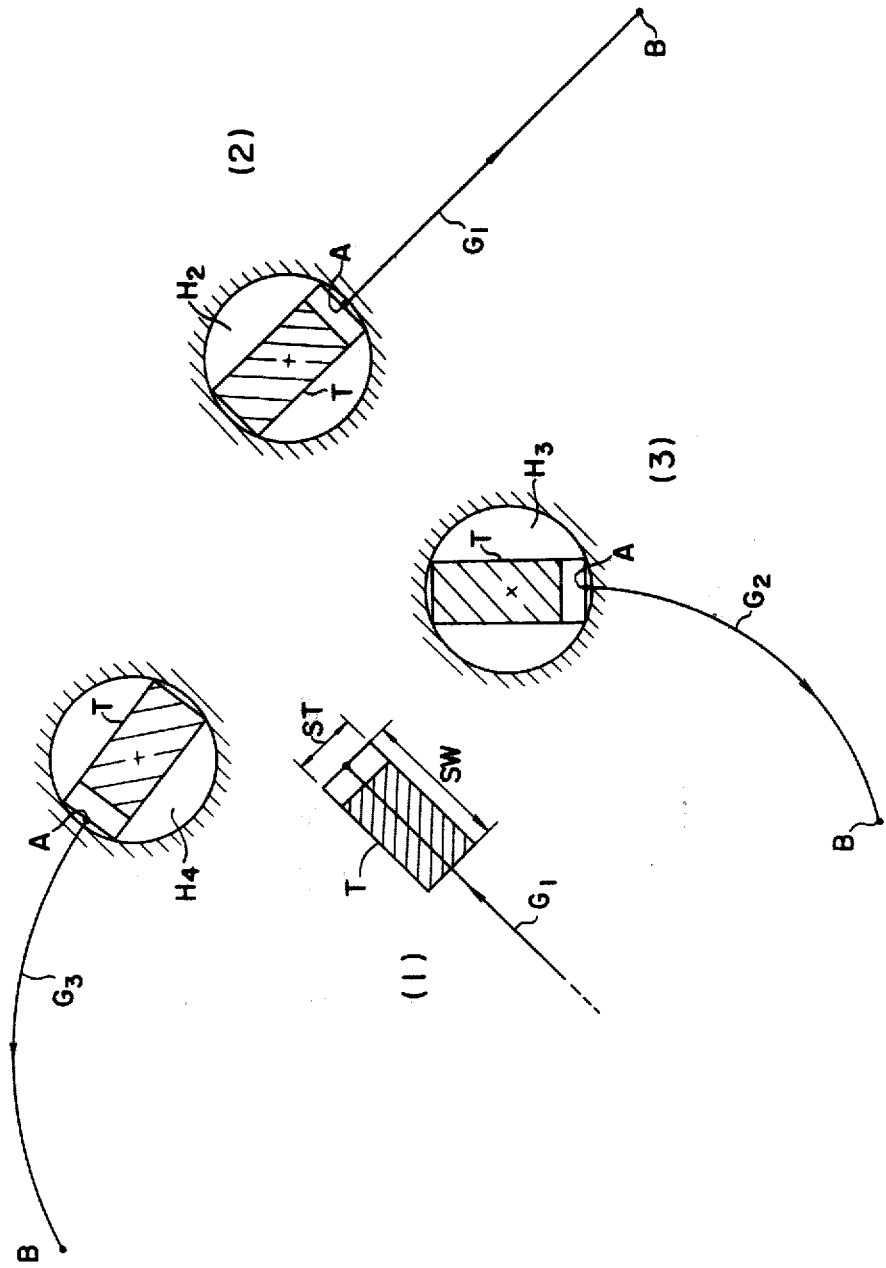
FIG. 14 is a diagram showing the variation in the orientation of the saw blade at points A at which the cutting operation is initiated by input data and the states of the fret saw teeth inserted in openings corresponding to respective starting points A.

FIG. 14 shows the orientation of a tooth of the fret saw blade T when its state is changed from state (1) to state (2), (3) or (4).

In the state (2), the center of the tooth of the saw blade T is positioned at the cutting starting point and the tooth is oriented toward point B. The center of the opening H₂ for receiving the fret saw blade T is displaced from the cutting starting point A to a point on the extension of line AB by $\frac{1}{2}$SW, the direction of displacement being opposite to the direction of cutting.

Figure 15:
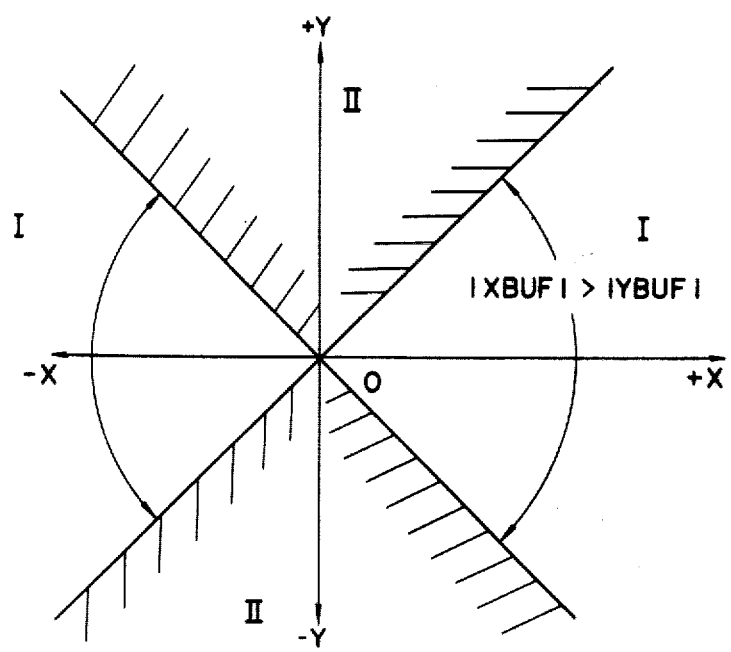
FIG. 15 shows a rectangular coordinate system which is divided into two regions I and II.

FIG. 15 is a diagram for explaining the method of determining the orientation of a tool according to this invention.

FIG. 15 shows that when the center of the tool (in this example, the present position of the center of a tooth of a fret saw blade) coincides with the origin O and when the data format of the axis movement to be instructed next time is a straight line G₁, XL and YL, for example, the directions of XL and YL coincide with the directions of X and Y axes.

As will be described later, XBUF and YBUF show values of registers for XL and YL (in the case of a circular arc, I and J). Consequently, the shaded region II corresponds to a condition $|XBUF| < |YBUF|$ whereas region I corresponds to a condition $|XBUF| \geq |YBUF|$.

Figure 16:
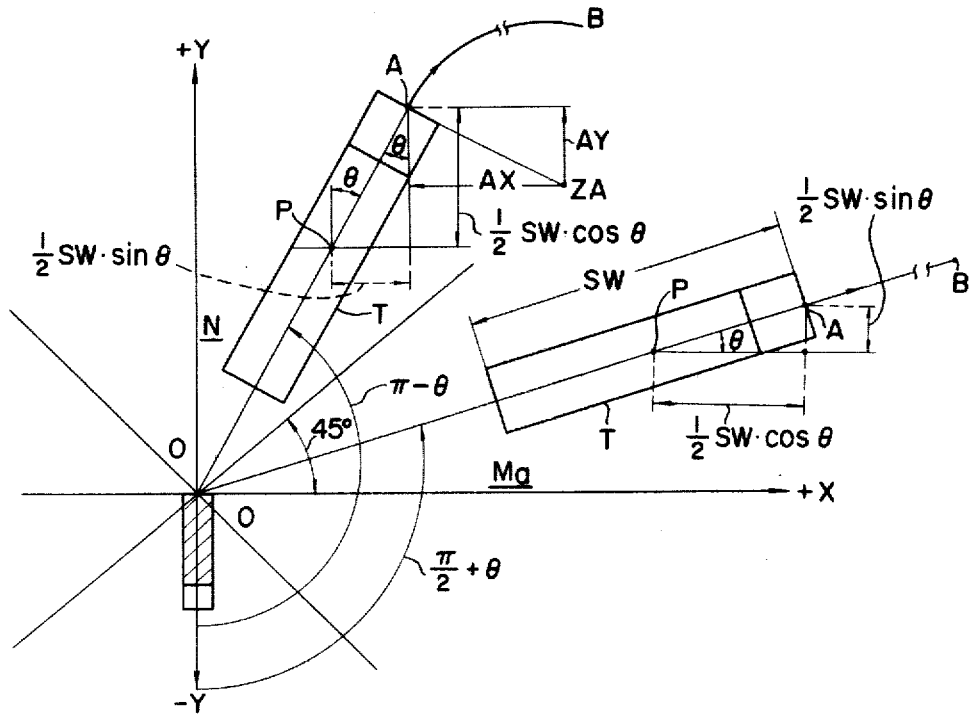
FIG. 16 is a diagram showing a case wherein the fret saw teeth are oriented in directions corresponding to the regions I and II in the first quadrant in FIG. 15 and FIGS. 17a and 17b, when combined, show a flow chart showing procedures for determining the tool orientation according to this invention.

FIG. 16 is a graph showing an instruction for changing the orientation of the fret saw blade or for moving the fret saw blade from the origin O to regions I and II. These relationships are shown in the first quadrant.

In FIG. 16, a diagram $M_a$ shows a case wherein the fret saw blade is moved along a straight line from a starting point A to an end point B located in region I in which $|XBUF| \geq |YBUF|$ and $XBUF > 0$, $YBUF > 0$. In this case, $$\theta = \tan^{-1}\left(\left|\frac{YBUF}{XBUF}\right|\right)$$

and the direction of a vector with respect to the reference direction of C shaft is given by $\pi/2 + \theta$.

In the case shown in N, the fret saw blade is moved in region II where $|XBUF| < |YBUF|$ and $XBUF > 0$, $YBUF > 0$.

Since $$\theta = \tan^{-1}\left(\left|\frac{XBUF}{YBUF}\right|\right)$$

the orientation that is the direction of vector $\overrightarrow{O \cdot A}$ at the starting point of an arc $\overset{\frown}{A \cdot B}$ is given by $\pi - \theta$.

FIGS. 17a and 17b show a flow chart showing the procedure of determining the tool orientation according to this invention. Thus, after starting at step ST1 a judgement is made whether the written instruction code is an opening forming code T4 or not. When the result is yes, at the next step ST2, a judgement is made whether a code following code T4 is a straight line cutting, an arc cutting or another instruction code or not. At step ST2 the code is judged as G₁, G₂ or G₃ and at step 3 whether the code is the straight line code G₁ or not is judged. At step 3 when the code is judged as the code G₁, at step ST4 data XL and YL following code G₁ are set in the XBUF and YBUF buffers, where XL and YL represent the increments in X and Y directions between the starting point A and the end point B. At step ST3, when the code is judged as code G₂ or G₃, at step ST5, I and J are set in XBUF and YBUF respectively where I and J represent increments in the X and Y directions between the center of an arc and the starting point A thereof. Then at step ST6, the absolute values of XBUF and YBUF are compared with each other. When $|XBUF| > |YBUF|$, at step ST7 value of $$\alpha = \frac{YBUF}{XBUF}$$

is determined, then at step 8 the value of $\theta = \tan^{-1}(|\alpha|)$ is determined. When the result of step 6 is no, at step 9 the value of $\alpha$ is determined and the value of $\theta$ is calculated at step 10.

Accordingly, the value of $\theta$ calculated at steps 8 and 10 are always expressed as follows.

$$0 \leq \theta \leq \tfrac{1}{4}\pi$$

When the result of step 11 is YES, that is $YBUF \geq 0$, at step 12 a judgement is made whether $XBUF \leq 0$ or not and when the result is YES, at step 13 $\pi/2 + \theta$ is given as the absolute value $\theta_{ABS}$, whereas when the result is NO, at step 14 $(3/2)\pi - \theta$ is given as the absolute value of $\theta$. When the result of step 11 is NO, at step 15 a judgement is made whether XBUF is smaller than 0 or not, and when the result is YES, $2/3\pi + \theta$ is calculated as the absolute value of $\theta_{ABS}$ at step 17, whereas if the result is NO at step 16 $(\pi/2) - \theta$ is calculated as the absolute value of $\theta$.

Similar processing as steps ST 11 through ST 17 are executed at steps 18 through 24 to calculate $\theta$, $\pi - \theta$, $\pi + \theta$ and $2\pi - \theta$ respectively.

Then at step 25 a judgement is made as to whether the code is $G_1$ or not. When the code is not $G_1$, at step 27, a judgement is made whether the code is $G_2$ (clockwise) or not. When the result is YES at step 29 $\theta_{ABS} - (\pi/2)$ is calculated as $\theta_{ABS}$ whereas when the code is $G_3$, at step 28, $\theta_{ABS} + \pi/2$ is calculated as the value of $\theta_{ABS}$.

The value of $P_2$ calculated at step 26 gives the orientation of the saw teeth at the starting point of the cutting corresponding to the applied movement data. As shown at the bottom of FIG. 17a, the calculated value of $P_2$ is stored in register $R_2$ of $RAM_1$ and compared by comparator CMP with the value of $P_1$ of the present value register $R_1$. The pulse CPM of the servo-out register SC (FIG. 11) is applied to the present value register $R_1$ until a coincidence is reached. Of course the pulse CPM is controlled such that the direction of rotation is controlled in accordance whether $|P_2 - P_1|$ is larger or smaller than 1000 to quickly attain the desired orientation.

It should be understood that instead of using a microcomputer, the processing of the data can also be done with hardwares.

While in the example shown in FIGS. 16a and 16b, $\theta_{ABS}$ was corrected at steps 25, 27, 28 and 29 after calculating $\theta_{ABS}$ at steps 13, 14, 16, 17, 20, 21, 23 and 24 such correction can also be made by selecting $\theta_{ABS} = -\pi/2$ and $\theta_{ABS} = +\pi/2$ respectively when $G_1$ and $G_3$ are judged at step 3 and then adding values 0, $-\pi/2$ and $+\pi/2$ corresponding respectively to $G_1$, $G_2$ and $G_3$ to the values of $\theta_{ABS}$ respectively given by steps 13 through 24.

When a straight path is cut, the orientation of the fret saw blade which is set at the time of start is maintained whereas when a curved groove is cut a pulse CPM is applied in synchronism with the interpolation of the movements in the X and Y directions. This pulse sequentially corrects the content of the present value register $R_1$. When the content comes to coincide with the orientation at the end of the arc, a coincidence signal is produced which is stored in register $R_2$ after it has been cleared.

This invention has the following advantages:

1. Since the data format utilized in this invention is the same as that of the data utilized to move a spindle of a conventional numerically controlled machine tool, it is possible to determine the new orientation of the tool by the procedure shown in FIGS. 16a and 16b without designating the amount of rotation of the tool.

2. According to this invention, by giving the tool moving data the value $P_1$ of the present value register $R_1$ is corrected such that it becomes equal to a value calculated according to this invention so that it is possible to automatically orient the tooth of the fret saw blade to the desired orientation at the starting point of the cutting even when there are many discontinuities or noncut portions.

What is claimed is:

1. Apparatus for forming a discontinuous groove through a die board, said groove being adapted to be embedded with cutting blades for punching a pattern, comprising:
   a fret saw machine including a drill, and a fret saw blade and a table supporting said die board, means for moving said table in X and Y directions of rectangular coordinates with respect to said drill and said fret saw blade, means for controlling an orientation of said fret saw blade;
   a numerical control means for applying instructions for varying an orientation of said fret saw and movement of said table during machining of said groove;
   said numerical control means comprising:
   (1) memory means for storing a present orientation $\theta$ABS of said fret saw blade measured from a reference direction,
   (2) means for successively supplying program data $G_1$, XL and YL (where $G_1$ represents a code meaning a straight line interpolation, and XL and YL rectangular coordinates of an end point of a linear movement), and $G_2$ (or $G_3$), XL, YL, I and J (where $G_2$ and $G_3$ represent codes meaning clockwise and counter-clockwise arcuate interpolations respectively, XL and YL have the same meaning as above defined, and I and J represent increments from centers of arcuate movements in clockwise and counter-clockwise directions respectively with reference to starting points or said arcuate movements) for moving said fret saw blade relative to said die board with reference to a segment portion of a groove to be cut,
   (3) means for changing an orientation of said blade in a tangential direction according to data given by said program data at a starting point of a new segment through which a hole for inserting said fret saw blade has already been formed,
   (4) means for confirming the fact that said present orientation coincides with an orientation instructed by said memory means,
   (5) means for starting a cutting operation by moving said fret saw blade relative to said die board after said confirmation,
   (6) means for storing a switch back length ($\Delta L$) determined by a width (SW) of said fret saw blade given from program data with reference to informations regarding said tools.

2. The apparatus according to claim 1, wherein said numerical control device comprises means for setting a switch back length $\Delta L$.

3. A method of forming a groove including a straight portion and an arcuate portion through a die board, said groove being adapted to be embedded with cutting blades for punching a pattern by using a numerically controlled fret saw machine including a drill, a fret saw blade, a table for supporting said die board, and means for moving said table in X and Y directions of rectangular coordinates with respect to said drill and said fret saw blade, said method comprising the steps of:
   forming openings with said drill near one end of the straight and arcuate portions of said groove;
   inserting said fret saw blade into said openings for cutting said straight and arcuate portions of said groove;
   effecting a switch back operation at a portion of said groove where the orientation of said fret saw blade is changed, and
   determining the orientation of said fret saw blade before the same is inserted into said opening according to the following steps:
   (a) predetermining $G_1$, XL, YL for a linear movement, $G_2$, XL, YL, I, J, or $G_3$, XL, YL, I, J for an arcuate movement of said fret saw blade as program data for relatively moving said fret saw blade with respect to said die board, where $G_1$ represents a code meaning a straight line interpolation (b) judging whether given data relates to a straight line segment ($G_1$) or an arcuate segment ($G_2$) or ($G_3$), (c) storing data XL and YL in buffer registers (XBUF) and (YBUF) respectively where the result of jugment of said step (b) shows a straight line segment and storing data I and J in said buffer registers (XBUF) and (YBUF) respectively where the results show an arcuate movement, (d) comparing the absolute values of the contents of said buffer registers (XBUF) and (YBUF), (e) calculating an angle $\theta = \tan^{-1}|\alpha|$ when $|XBUF| \geq |YBUF|$, where $$\alpha = \frac{YBUF}{XBUF}$$

and XBUF and YBUF represent the contents of the buffer registers (XBUF) and (YBUF) respectively, (f) calculating an angle $\theta = \tan^{-1}|\alpha|$ when $|XBUF| < |YBUF|$ where $$\alpha = \frac{XBUF}{YBUF},$$

(g) judging whether the signs of XBUF and YBUF are one of the combinations $(+, +), (+, -), (-, +)$ and $(-, -)$ or not, provided that $+$ sign includes zero, (h) combining the results of steps (d) and (g) to add to $\theta_{ABS}$ one of $\pi/2 + \theta$, $2/3\pi - \theta$, $(\pi/2) - \theta$, $(3/2)\pi + \theta$, $\theta, \pi - \theta$ and $2 2\pi - \theta$ as the value of $\theta_{ABS}$ in accordance with the result of said combination, thus determining an angle of orientation of said tool, and (i) where an arc is judged as a result of step (b), judging whether working is made in the clockwise ($G_2$) or counter-clockwise direction ($CG_3$), and when $G_2$ is judged, subtracting $\pi/2$ from $\theta_{ABS}$ given by step (h) to determine a new $\theta_{ABS}$, whereas when $G_3$ is judged, adding $\pi/2$ to $\theta_{ABS}$ to form an another new $\theta_{ABS}$.

* * * * *